Aug. 9, 1966  H. A. THOMSON  3,265,266
MEANS FOR RESTRAINING WEBS DURING THREADING
Filed May 14, 1964
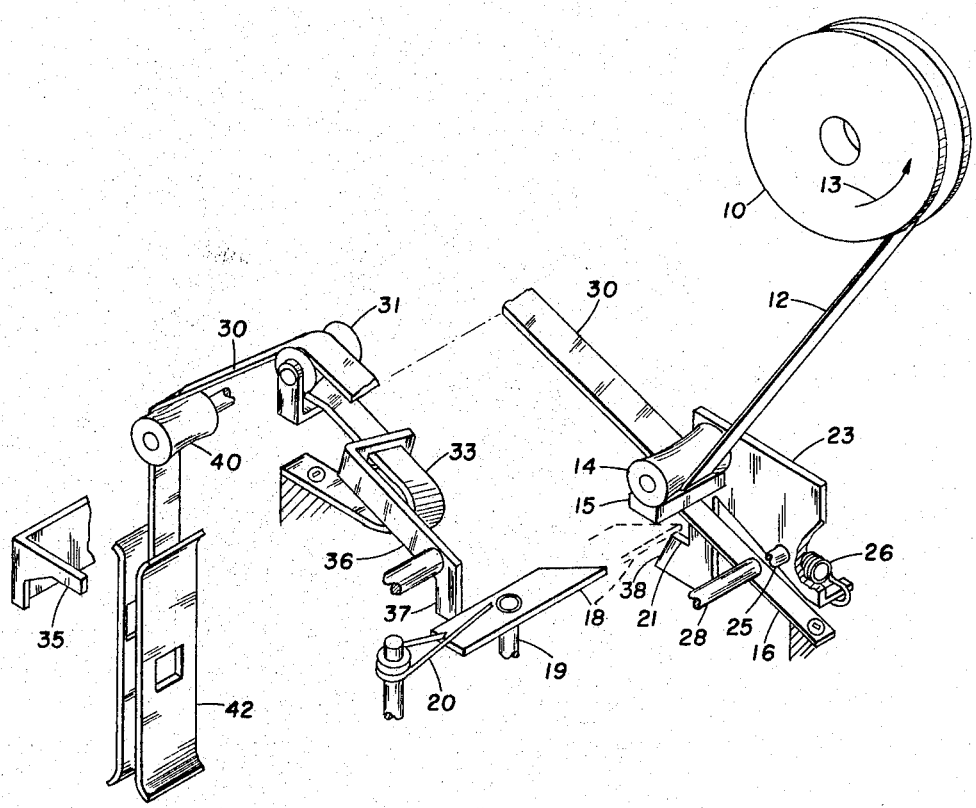
HENRY A. THOMSON
INVENTOR.
BY R. Frank Smith
David P. Ogden
ATTORNEYS › # United States Patent Office 3,265,266
Patented August 9, 1966

3,265,266
MEANS FOR RESTRAINING WEBS DURING THREADING
Henry A. Thomson, Rochester, N.Y., assignor to Eastman Kodak Company, Rochester, N.Y., a corporation of New Jersey
Filed May 14, 1964, Ser. No. 367,535
7 Claims. (Cl. 226—39)

The present invention relates to a clamping device and more particularly to a friction retaining means for a filmstrip being inserted in a film projector.

In the art of photographic film projectors and magnetic tape devices, several arrangements for preventing undesired slippage or unwinding of the web have been developed in prior art equipments. By way of example, such equipment is necessary to prevent unwinding and resulting tangling of tapes partially threaded in a pocket-sized portable utilization device. A somewhat different problem arises in connection with a film projector wherein a constant tension is maintained between the supply reel and the film in the projector itself. The constant rewind tension develops the tendency of the film to rewind on the supply reel prior to its being engaged by the main drive mechanism of the projector. This problem tends to be particularly acute in such a projector when this projector is provided with an automatic threading arrangement because the constant tension in the film would tend to withdraw the filmstrip to the supply reel at the same time the self-threading mechanism was attempting to obtain control the film leader.

Therefore, an object of the present invention is to provide a clamping device which will prevent rewinding of the film during the threading of a film projector.

In accordance with one embodiment of my invention, a clamping device is arranged to engage the trailing end of a leader strip of a movie film during the automatic threading operation of the film so that the tension developed by the supply reel will not interfere with the threading operation. At such time as tension is placed on the leader strip of a magnitude substantially equal to or greater than that provided by the supply reel, a dancing roller between the clamping means and a film gate is deflected. Such deflection unlatches the clamping means whereby the projector is operable without continuous frictional engagement thereof on the filmstrip.

The subject matter which is regarded as my invention is particularly pointed out and distinctly claimed in the concluding portion of this specification. The invention, however, as to its organization and operation together with further objects and advantages thereof will best be understood by reference to the following description taken in connection with the accompanying drawing in which the single figure illustrates a partially exploded perspective view of a preferred embodiment of my invention.

Referring now to the drawing, I have shown a film supply reel 10 having applied thereto by a slipping clutch (not illustrated) a continuous force tending to maintain tension in a perforated film 12 by a tendency of the reel 10 to rotate in a counterclockwise direction as indicated by the arrow 13. During the initial threading operation, rewinding of the filmstrip 12 on the reel 10 is prevented by a frictional retaining means consisting of a lead-in roller 14 and a friction pad 15. The anti-rewind pressure developed between the roller 14 and the friction pad 15 is maintained by a leaf spring 16 so long as the roller 14 is in the depressed position as illustrated. The rewind slipping clutch (not illustrated) may be envisioned as a low torque magnetic clutch developing about one ounce tension in the film strip 12. Also, I prefer that the roller 14 be fabricated of metal such as chrome plated steel that will not be deformed in any way because of continued pressure developed by the pad 15. The pad itself is preferably of a relatively soft high friction material such as certain cork materials or rubber.

The roller 14 is latched in a depressed position by a trigger 18 (as indicated in dashed lines) mounted on a pivot support 19 and biased by a spring 20 to reside in a slot 21 of a pivotable arm 23 supporting the roller 14. As indicated, the arm 23 is pivotable about a support 25 and is urged upward by a spring 26. When released by the trigger 18, the upward movement in response to the spring 26 is sufficient so that contact between the roller 14 and the pad 15 is terminated. Such termination is accomplished because the leaf spring 16 engages a motion-limit pin 28 at a point less than the full stroke of the arm 23 in response to the spring 26.

Release of the trigger 18 is accomplished by tension in a leader film portion 30 secured to the perforated filmstrip 12 and passing over a dancing roller 31. I prefer that the roller 31 be of a relatively lightweight plastic material. The roller 31 is supported on a relatively soft and low mass leaf spring 33 so that tension developed by a claw tip 35 in the leader 30 will pull the roller 31 down against the bias of the spring 33 and thereby deflect an arm 36 sufficiently so that its tail portion 37 rotates the trigger 18 against the bias of the spring 20 to retract the trigger from the slot 21. According to one embodiment of my invention, upon retraction from the slot 21, the arm 23 moves upward whereby a tail ramp surface 38 maintains the trigger 18 in a retracted position. In this position the trigger 18 no longer interferes with the tail portion 37 during normal operation of the dancing roller 31. Another roller 40 is illustrated to guide the filmstrip 12 and leader 30 into a film gate 42.

As should be apparent from the above presentation of the parts of my invention, the tension maintained in the filmstrip 12 would quickly rewind any slack part of the leader portion 30 on the supply reel 10 when the system, including the drive means of the supply reel, is energized as is requisite for the self-threading operation of the leader 30. In other words, if it were not for the clamping means of my invention the self-threading operation would not reliably operate quickly enough to completely thread the projector including the film gate 42 prior to the rewinding of the leader portion on the supply reel whereby the self-threading operation would be frustrated. On the other hand, once threading is accomplished the tension developed by the roller and friction pad 14 and 15 would tend to load excessively the claw tip 35 with resulting damage to the perforations of the film 12. Thus it is obviously necessary to release the clamping means once film threading is properly commenced. If the clamp were not disengaged, the frictional engagement of the pad 15 against the emulsion containing filmstrip 12 would result in scratches and damages thereto which are impracticable when it is desired to repeatedly show the same filmstrip.

Also, this arrangement allows the claw tip 35 to operate without being required to unwind the reel 13 directly in the sense that the inertia of the entire filmstrip 12 and reel 10 must be overcome by the force supplied to the film by the claw tip 35. The soft force of the spring 33 on the roller 31 is designed to be sufficient to overcome the rewind torque (13) and yet flexible enough so that the claw tip does not have to overcome any inertia of the system other than that of the short piece of filmstrip between the claw tip 35 and the roller 31 and the small mass of the dancer roller assembly (31).

While I have shown and described a particular embodiment of my invention, other modifications coming within the true spirit and scope of the present invention may be visualized. To the extent that such modifications are properly within the scope of my invention, I intend the appended claims to cover them.

I claim:
1. A clamping device for preventing premature rewinding of a filmstrip on a constantly tensioned supply reel comprising:
   a lead-in roller arranged to have a leader portion of the filmstrip threaded therepast;
   a friction pad biased against said lead-in roller to prevent rewind of the filmstrip by the supply reel;
   latching means for maintaining said lead-in roller in engagement with said pad;
   a dancing roller downstream of said pad arranged to guide the filmstrip toward a film gate;
   drive means associated with the film gate for driving the filmstrip therethrough, said drive means developing sufficient tension in the filmstrip to deflect said dancing roller; and
   linkage means coupling said dancing roller to said latching means to release said lead-in roller from engagement with said pad when said dancing roller is deflected a predetermined amount.

2. A clamping device as in claim 1 having:
   means for limiting the motion of said friction pad toward said lead-in roller; and
   spring means urging said lead-in roller beyond the control of said pad when unlatched.

3. A clamping device as in claim 2 wherein said latching means is a pivotable trigger biased to reside in a slot of a pivotable support of said lead-in roller, and said linkage means includes a lever which engages the trigger to retract it from the slot when said dancing roller is deflected by the tension in the filmstrip.

4. A clamping device for preventing premature rewinding of a filmstrip on a constantly tensioned supply reel, comprising:
   a lead-in roller arranged to have a leader portion of the filmstrip threaded therepast;
   pivotable means for supporting said lead-in roller;
   spring means for biasing said lead-in roller support means toward a raised position;
   latching means for conditionally maintaining said lead-in roller in a depressed position;
   a friction pad spring biased against said lead-in roller when in the depressed position to prevent rewind of the filmstrip by the supply reel;
   a dancing roller downstream of said pad arranged to convey the filmstrip toward a film gate;
   drive means associated with the film gate for driving the filmstrip therethrough, said drive means developing sufficient tension in the filmstrip to deflect said dancing roller; and
   linkage means coupling said dancing roller to said latching means to release said lead-in roller support means whereby the filmstrip is released by said pad when said dancing roller is deflected a predetermined amount.

5. A clamping arrangement as in claim 4 having:
   means for limiting the motion of said friction pad toward said lead-in roller when said spring means urges said lead-in roller support to the raised position.

6. A clamping arrangement as in claim 5 wherein said linkage means includes a pivotable lever, rotatable during depressing of said dancing roller to release said latching means.

7. A clamping arrangement as in claim 6 wherein said lead-in roller support means includes a ramp surface arranged, when in the raised position, to engage a portion of said latching means and move it to a position which will not interfere with said linkage means pivotable lever during deflection of said dancing roller.

References Cited by the Examiner
UNITED STATES PATENTS

| | | | |
|---|---|---|---|
| 1,972,456 | 9/1934 | Newman et al. | 226—39 |
| 2,766,945 | 10/1956 | Reich | 242—156.2 X |
| 2,983,468 | 5/1961 | Perrella | 242—156.2 |

M. HENSON WOOD, Jr., *Primary Examiner.*

A. N. KNOWLES, *Assistant Examiner.*